United States Patent
Wenger (10) Patent No.: US 10,178,590 B2
(45) Date of Patent: Jan. 8, 2019

(54) COMMUNICATIONS WITH A MOBILE VIRTUAL BASE STATION

(71) Applicant: Swisscom AG, Bern (CH)

(72) Inventor: Daniel Wenger, Uttigen (CH)

(73) Assignee: SWISSCOM AG, Bern (CH)

( * ) Notice: Subject to any disclaimer, the term of this patent is extended or adjusted under 35 U.S.C. 154(b) by 108 days.

(21) Appl. No.: 14/473,192

(22) Filed: Aug. 29, 2014

(65) Prior Publication Data
US 2015/0063300 A1 Mar. 5, 2015

(30) Foreign Application Priority Data

Aug. 30, 2013 (EP) .................................. 13182325

(51) Int. Cl.
*H04W 36/12* (2009.01)
*H04W 36/08* (2009.01)
*H04W 36/00* (2009.01)
*H04W 84/00* (2009.01)

(52) U.S. Cl.
CPC ....... *H04W 36/08* (2013.01); *H04W 36/0005* (2013.01); *H04W 84/005* (2013.01)

(58) Field of Classification Search
CPC H04W 36/0005; H04W 36/08; H04W 84/005
See application file for complete search history.

(56) References Cited

U.S. PATENT DOCUMENTS

| 6,115,615 A * | 9/2000 | Ota ................. H04B 10/25752 455/422.1 |
| 8,711,803 B1 * | 4/2014 | Wang ................ H04W 36/023 370/331 |
| 2004/0121749 A1 | 6/2004 | Cui et al. |

(Continued)

FOREIGN PATENT DOCUMENTS

| EP | 1237389 | 9/2002 |
| WO | 0036858 | 6/2000 |

OTHER PUBLICATIONS

European Search Report for Application No. 13182325.4, 12 pages, dated May 9, 2014.

(Continued)

*Primary Examiner* — Mansour Oveissi
(74) *Attorney, Agent, or Firm* — McAndrews, Held & Malloy, Ltd.

(57) ABSTRACT

Methods and systems are provided for using virtual base stations in communication systems. A communication system may comprise a plurality of fixed base stations. A virtual base station may be generated and/or assigned to a fixed base station in the communication system, with the fixed base station emitting signals of the virtual base station. The communication system may also comprise at least one network node, and communication system may be configured to transmit data of the virtual base station between the at least one network node and the assigned fixed base station, and emit signals of the virtual base station from the assigned fixed base station with the transmitted data of the virtual base station. The data of the virtual base station may be transmitted from the network node over multicast and/or broadcast connections, to the assigned fixed base station and to one or more fixed base stations.

27 Claims, 3 Drawing Sheets

(56) References Cited

U.S. PATENT DOCUMENTS

| | | | |
|---|---|---|---|
| 2004/0151157 A1* | 8/2004 | Nishimura | H04L 12/189 370/349 |
| 2004/0185918 A1* | 9/2004 | Fan | H04W 52/0248 455/574 |
| 2006/0094400 A1 | 5/2006 | Beachem et al. | |
| 2006/0264212 A1 | 11/2006 | Sekhar | |
| 2007/0135161 A1* | 6/2007 | Molnar | H04B 7/024 455/553.1 |
| 2007/0291668 A1* | 12/2007 | Duan | H04B 7/15535 370/280 |
| 2008/0043655 A1* | 2/2008 | Lee | H04L 12/4641 370/310.1 |
| 2009/0042563 A1* | 2/2009 | Bernard | H04W 36/18 455/432.1 |
| 2009/0141658 A1 | 6/2009 | Day et al. | |
| 2009/0141685 A1 | 6/2009 | Berglund | |
| 2011/0055875 A1 | 3/2011 | Zussman | |
| 2012/0063383 A1* | 3/2012 | Barbieri | H04W 72/082 370/315 |
| 2012/0209934 A1 | 8/2012 | Smedman | |
| 2013/0028157 A1 | 1/2013 | Ruster et al. | |
| 2013/0086665 A1 | 4/2013 | Filippi et al. | |
| 2014/0064257 A1* | 3/2014 | Fontaine | H04W 76/025 370/336 |
| 2015/0381776 A1* | 12/2015 | Seed | H04L 67/16 709/203 |

OTHER PUBLICATIONS

Aruba Networks: "ArubaOS 6.1", pp. 1-2, 45-58, 111-170, 295-324, dated Aug. 2013.

* cited by examiner

COMMUNICATIONS WITH A MOBILE VIRTUAL BASE STATION

CLAIM OF PRIORITY

Pursuant to 35 U.S.C. § 119, this patent application claims the filing date benefit of and right of priority to European (EP) Patent Application No. 13182325.4, filed Aug. 30, 2013. The above application is hereby incorporated herein by reference in its entirety.

FIELD

The present disclosure relates to communications methods and systems. More specifically, certain embodiments of the present disclosure relate to methods and systems for communications with a mobile virtual base station.

BACKGROUND

Connection quality in modern mobile radio communication has greatly improved in recent years. There are, however, still situations in which difficulties may arise in setting up connections, in maintaining the connections and/or in terms of quality of the connections. This is the case for example in transportation based user scenarios, such as in trains. Trains carry a large number of mobile communication devices, corresponding to (typically) large number of passengers or other persons (e.g., crew) on the trains. Due to the speed, each mobile communication device in the train has to incessantly organize a transfer of the connection to the next base station. This not only puts a great strain on the mobile communication device and the existing connection, it also places a very heavy burden on the mobile network every time the train enters the area covered by a new base station. In such a situation, a large number of mobile communication devices may nearly simultaneously request a transfer of connections to the same base station. The base station must therefore be designed for loads that far exceed the average load. Further, there are many applications that may be run in modern mobile devices, which may not stable in the context of a connection transfer to the next base station.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE DISCLOSURE

A system and/or method is provided for communications with a mobile virtual base station, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF THE DRAWINGS

Various features and advantages of the disclosure will become apparent from the following description of non-limiting exemplary embodiments, with reference to the appended drawings, in which.

DETAILED DESCRIPTION OF THE DISCLOSURE

As utilized herein the terms "circuits" and "circuitry" refer to physical electronic components ("hardware") and any software and/or firmware ("code") which may configure the hardware, be executed by the hardware, and or otherwise be associated with the hardware. As used herein, for example, a particular processor and memory may comprise a first "circuit" when executing a first plurality of lines of code and may comprise a second "circuit" when executing a second plurality of lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "block" and "module" refer to functions than can be performed by one or more circuits. As utilized herein, the term "example" means serving as a non-limiting example, instance, or illustration. As utilized herein, the terms "for example" and "e.g.," introduce a list of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Certain embodiments of the present disclosure may be found in methods and systems for communication with a mobile virtual base station, as described below in more detail for example with reference to the attached figures. In particular, communication systems and methods are provided for establishing wireless broadband data communication between a moving object (e.g., train), comprising one or more mobile communication devices, and base stations arranged along the path (e.g., train track) travelled by moving object. Use of such communication systems and/or methods may enable minimizing the effort required for mobile devices moving together in large groups and for the communication system in the handover of those mobile devices.

In some example embodiments, a communication method may be used in a cellular communication system with fixed base stations, whereby a virtual base station may be assigned to a fixed base station, with the fixed base station emitting signals of this virtual base station. The data of the virtual base station may be transmitted from a network node over multicast and/or broadcast connections to the assigned fixed base station as well as to at least one other fixed base station.

In some example embodiments, a communication system may be used, which may comprise the one or more fixed base stations being used in wireless communication with mobile devices, with at least one fixed base station being configured to emit signals of the virtual base station. The communication system may also comprise at least one network node, which may be connected with at least some of the one or more fixed base stations, and configured to transmit data of the virtual base station to one fixed base stations that is assigned to the virtual base station and to at least one other fixed base station, over multicast and/or broadcast connections.

Use of the virtual base station in this manner—that is, in combination with multicast and/or broadcast connections between the fixed base stations and the network node—may enable switching assignment of the virtual base station and the network node easily, without requiring any change of the data flow for the virtual base station, since each fixed base station of the multicast and/or broadcast connections already receives the data of the virtual base station at any time. Accordingly, when the fixed base station assignment is switched, only the emission of the newly assigned fixed base station must be initiated. Thus, a change or transfer of the data flow may not be necessary.

In one example embodiment, the data of the virtual base station may be transmitted from the network node over multicast and/or broadcast connections to the assigned fixed base station and to one or more other fixed base stations, so that in case of a switch of the assignment of the virtual base station to one of the one or more other fixed base stations, the one of the one or more other fixed base stations may emit the signals of the virtual base station with the data of the virtual base station with the same data flow for the virtual base station in the multicast and/or broadcast connections.

In one example embodiment, in case of the switch of the assignment of the virtual base station from the assigned fixed base station to the one of the one or more other fixed base stations, the data received at the one of the one or more other fixed base stations over the multicast and/or broadcast connections are emitted from the newly assigned one of the one or more other fixed base stations.

In one example embodiment, the emission of the signals of the virtual base station from the previously assigned fixed base station may be stopped after the switch of the assignment.

In various example embodiments, the one of the one or more other fixed base stations which emits the signals of the virtual base station after the switch of the assignment may be adaptively selected. In an example embodiment, the one of the one or more other fixed base stations which emits the signals of the virtual base station after the switch of the assignment may be selected on the basis of a movement of a group of mobile devices connected with the virtual base station. Thus, virtual base stations may be associated with and/or follow large groups of mobile devices which have the same movement pattern without the necessity of a handover of the mobile devices.

In one example embodiment, the one of the one or more other fixed base stations emitting the signals of the virtual base station after the switch may be selected on the basis of a movement of transportation means (e.g., a train). Thus, virtual base stations may be associated with and/or follow the transportation means. Accordingly, because the virtual base station follows the transportation means, mobile devices in the transportation means do not need to perform a handover.

In one example embodiment, the one of the one or more other fixed base stations may be informed, in the case of the switch of the assignment, to emit the data of the virtual base station transmitted over the multicast and/or broadcast connections. Thus, the switch of the assignment of the virtual base station to another fixed base station can be performed by a simple command to the newly assigned fixed base station without a change of the data flow.

In one example embodiment, a previously assigned fixed base station may be informed, in the case of the switch of the assignment, to stop the emission of the data of the virtual base station transmitted over the multicast and/or broadcast connections. Thus, the switch of the assignment of the virtual base station to another fixed base station may be performed by a simple command to the newly assigned and previously assigned fixed base station without a change of the data flow.

In one example embodiment, the data of the virtual base station may be transmitted over the multicast and/or broadcast connections to the one or more other fixed base stations so that each of the one or more other fixed base stations may emit the signals of the virtual base station in the case of an assignment to the virtual base station. Thus, the virtual base station may be deviated among a large number of fixed base stations without changing the data flow between the network node and the fixed base stations.

In one example embodiment, a second virtual base station may be assigned to a second fixed base station, where the data of the second virtual base station may be transmitted from the network node over the multicast and/or broadcast connections to the fixed base station assigned to the virtual base station and to one of the one or more other fixed base stations assigned to the second virtual base station, and the second fixed base station emits signals of the second virtual base station. Use of multicast and/or broadcast connections for a group of fixed base stations in this manner may allow all virtual base stations emitted by this group of fixed base stations to have a common and constant transmission capacity. Therefore, the transmission capacity may remain the same, if one fixed base station would have to suddenly emit data of two virtual base stations and to handle the increased traffic with the same transmission capacity. The overall transmission capacity of the number of virtual base stations may be reduced in multicast and/or broadcast connections, compared to one-to-one connections, but the transmission capacity may not suddenly decrease, when one fixed base station has to emit data of one more virtual base station. Therefore, sudden data loss due to such sudden decreases in the transmission capacity may be avoided.

In one example embodiment, the data of the virtual base station may be transmitted from the fixed base station assigned to the virtual base station to the network node with a multiplexing method over the multicast and/or broadcast connections, and the data of the second virtual base station may be transmitted from the one or more other fixed base stations assigned to the second virtual base station to the network node with a multiplexing method over the multicast and/or broadcast connections.

In one example embodiment, the data of the virtual base station may be transmitted from the network node to the fixed base station assigned to the virtual base station with a multiplexing method over the multicast and/or broadcast connections, and the data of the second virtual base station may be transmitted from the network node to the one or more other fixed base stations assigned to the second virtual base station with a multiplexing method over the multicast and/or broadcast connections.

In one example embodiment, the data of the virtual base station from the network node may be addressed in the multicast and/or broadcast connections to the virtual base station. Thus, the data of the virtual base station may not have to be filtered out of the data addressed to the fixed base station assigned to the virtual base station. The data may be addressed directly to the virtual base station so that the assigned fixed base station may simply have to emit the data addressed to the virtual base station. No change of the data flow in the multicast and/or broadcast connections may be necessary.

In one example embodiment, the multicast and/or broadcast connections may be setup using a passive optical network.

In one example embodiment, the cellular communication system may be a mobile radio network, with the fixed base stations being the base stations of a mobile radio network. In such mobile radio networks (e.g., networks allowing for communications using mobile phones), each fixed base station may be connected with a point-to-point connection to the network node.

In one example embodiment, an emission region of the fixed base station assigned to the virtual base station may overlap with or be neighbored to emission region(s) of the one or more other fixed base stations. Having the group of fixed base stations which are connected with the same multicast and/or broadcast connections with the network node have neighboring emission regions may be advantageous to support operations of the virtual base station(s). In this regard, a virtual base station may be handed over to neighboring fixed base stations without any change of the data flow of the virtual base station in the multicast and/or broadcast connections. In particular, it is advantageous if the group of fixed base station are arranged along an itinerary of a transportation means, e.g., along a train itinerary.

In one example embodiment, the multicast and/or broadcast connections may comprise a first link with one of the fixed base stations, with the first link branches to a second link to a second one of the fixed base stations, where the second link branches to a third one of the fixed base stations.

In one example embodiment, the fixed base station assigned to the virtual base station may be able to emit signals assigned to the fixed base station in addition to the signals of the virtual base station.

In one example embodiment, the fixed base station assigned to the virtual base station may be configured to emit only signals of virtual base stations. Thus, a network for moving a mobile device may be constructed, with the network having sufficient capacity for serving several virtual base station emitted by the fixed base station without reducing the capacity of fixed base station for non-moving mobile devices.

Figure 1:
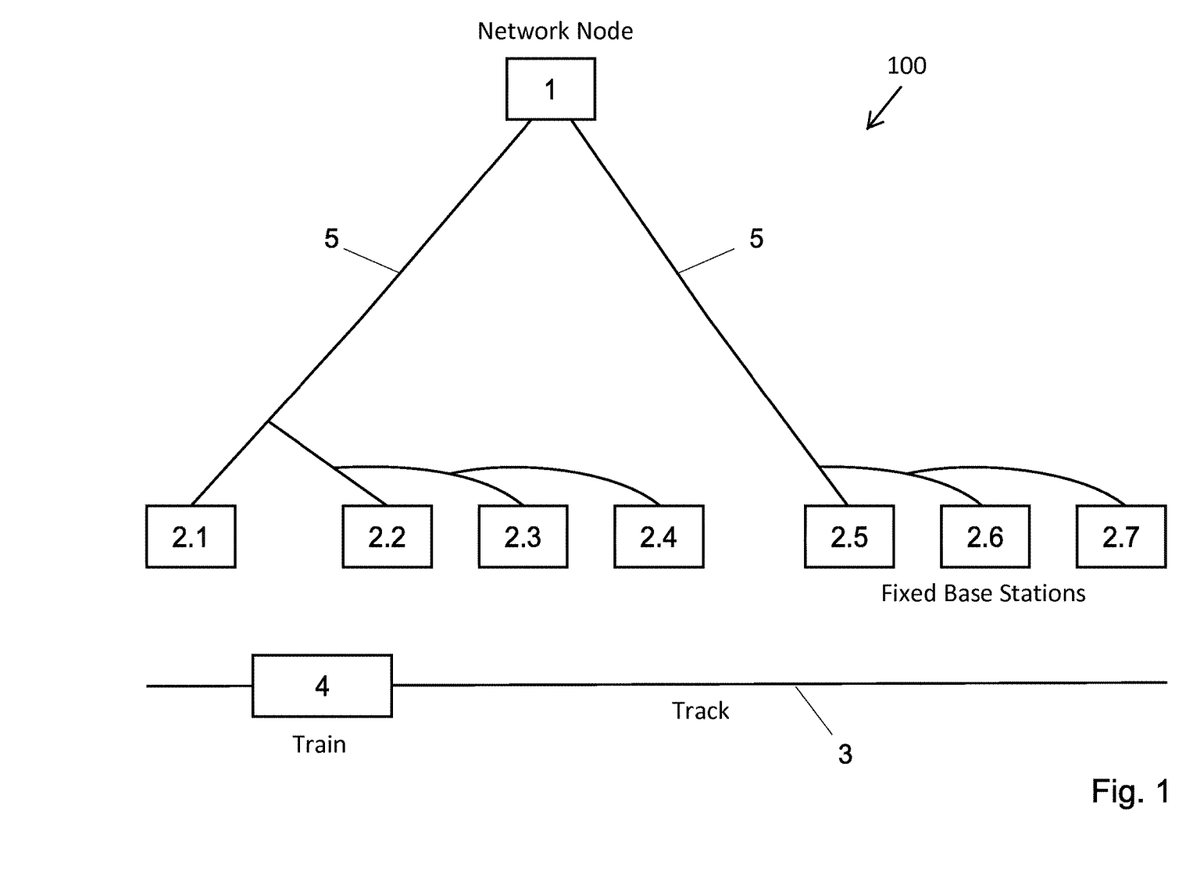
FIG. 1 illustrates a view of an example communication system.

FIG. 1 illustrates a view of an example communication system. Shown in FIG. 1, is a communication system that comprises a plurality of fixed base stations 2 (e.g., fixed base stations 2.1 to 2.7), which may be connected with one or more network nodes 1 of the communication system (e.g., via one or more connections 5).

The communication system 100 may be, for example, a mobile communication network or mobile telephone network such as GSM, GPRS, UMTS, LTE or any other suitable mobile communication standard for supporting mobile communications. The present disclosure is not limited, however, to mobile telephones, and may be applied in substantially similar manner to other technologies, such as Wireless Local Area Networks (WLAN), Wide Area Networks (WAN) or other wireless cellular or types of communication systems.

Each of the plurality of fixed base stations 2 and the one or more network nodes 1 may comprise suitable circuitry for implementing various aspects of the present disclosure.

The plurality of fixed base stations 2 may comprise a plurality of access points which may be configured for connecting mobile devices of the communication system 100 via wireless connections to the network nodes 1 and/or vice versa. Each fixed base station 2 may cover a specific transmission area, depending on the transmission characteristics of the fixed base station 2 and/or on the local conditions for example.

In various example implementations, the plurality of fixed base stations 2 may be arranged locally so that the transmission areas of the plurality of fixed base stations 2 together cover a specific (aggregate) transmission area. For example, the aggregate transmission area may correspond to, for example, a track 3 of a specific railway line or a track network for a train service in a certain area. Nonetheless, it should be understood that disclosure is not so limited, and that a same or similar approach as described herein may be used in other settings—e.g., to create transmission areas along motorways, rivers and other traffic ways and by other means of transportation (such as e.g., cars, boats, etc.). Further, while not particularly shown in FIG. 1, the communication system 100 may also comprise further fixed base stations 2 that are not in the vicinity of the track 3.

In legacy systems, each fixed base station may be configured to transmit a signal associated with that fixed base station. On the basis of this signal associated with the fixed base station, a mobile device may identify the corresponding fixed base station, and distinguish it from other base stations. Thus, the mobile device may decide, based the different signals of different base stations, with which base station to connect. In various implementation of the present disclosure, however, the plurality of fixed base stations 2 may be configured for sending a signal associated with one or more virtual base stations. In this regard, the signals may be configured such that they appear to a mobile device logged into the virtual base station as always coming from the same base station, namely the virtual base station, regardless of from which fixed base station 2 these signals of the virtual base station are sent. For example, in the example implementation depicted in FIG. 1, the fixed base station 2.2 is close to a train 4 and the fixed base station 2.2 transmits signals of a virtual base station.

In an example implementation, the plurality of fixed base stations 2 may be configured for sending both signals associated with the corresponding fixed base station 2 as well as signals of at least one virtual base station. In another example implementation, however, the plurality of fixed base stations 2 may be configured for only transmitting signals of at least one virtual base station without sending signals associated with the corresponding base station. In a further example implementation, the plurality of fixed base stations 2 may comprise at least one fixed base station that is configured to transmit both its own signals as well as signals of at least one virtual base station as well as at least one fixed base station that is configured to only send signals of at least one virtual base station. In some example implementations, regardless of the capability to only transmit signals of at least one virtual base station or to transmit its own signals as well as signals of at least one virtual base station, at least one of the fixed base station 2 may be configured to additionally transmit signals of at least one further (e.g., second) virtual base station.

The fixed base stations 2 may be connected by means of an optical point-to-point connection with a network node. In some example implementations, however, a multicast network is used for connecting several fixed base stations 2 with the network node 1. Such network may comprise, for example, a passive optical network (PON). The multicast network may be configured for delivering similar information to one or more sets of the fixed base stations. For example, in the implementation depicted in FIG. 1, such multicast network may be configured to deliver over the connection(s) 5 (first) same information to a first set of the fixed base stations 2 (e.g., fixed base stations 2.1, 2.2, 2.3 and 2.4), and (second) same information to a second set of the fixed base stations 2 (e.g., fixed base stations 2.5, 2.6 and 2.7). Thus, the first set of the fixed base stations 2 (e.g., fixed base stations 2.1, 2.2, 2.3 and 2.4) may be located in a first branch of the network, and the second set of the fixed base stations 2 (e.g., fixed base stations 2.5, 2.6 and 2.7) may be located in the second branch of the network. It should be understood, however, that the disclosure is not so limited, and that any other number of fixed base stations 2 in a branch and any other number of branches are possible. Configuring a network in the communication system 100 in such a manner may be advantageous as no administrative effort may need to be made in order to monitor which fixed base station 2 currently hosts the virtual base station in order to send the correct information to the selected fixed base stations 2. The information for the virtual base station are sent simultaneously to several base stations 2 (multicast) so that the selected fixed base station 2 must be simply informed, when it must emit the signals of the virtual base station.

The data packages of a virtual base station may be addressed directly to the virtual base station so that the selected base station (e.g., fixed base station 2.2) only needs the identification information of the virtual base station in order to retrieve from the multicast network the information to be transmitted of the virtual base station. Thus, all information about all virtual base stations active in the plurality of fixed base stations 2.1 to 2.4 is sent to all these fixed base stations 2.1 to 2.4.

A switch of the virtual base station among the plurality of fixed base stations 2 (e.g., from fixed base station 2.2 to fixed base station 2.3) is thus possible with a very low administrative effort for the communication system 100. The multicast network could also exist additionally to a point-to-point connection with the network nodes 1. This would enable information for a signal associated with the fixed base station 2 to be transmitted via the point-to-point connection to the fixed base station 2, while the information for the virtual base stations is sent over the multicast network 5 to the plurality of fixed base stations 2.

Figure 2:
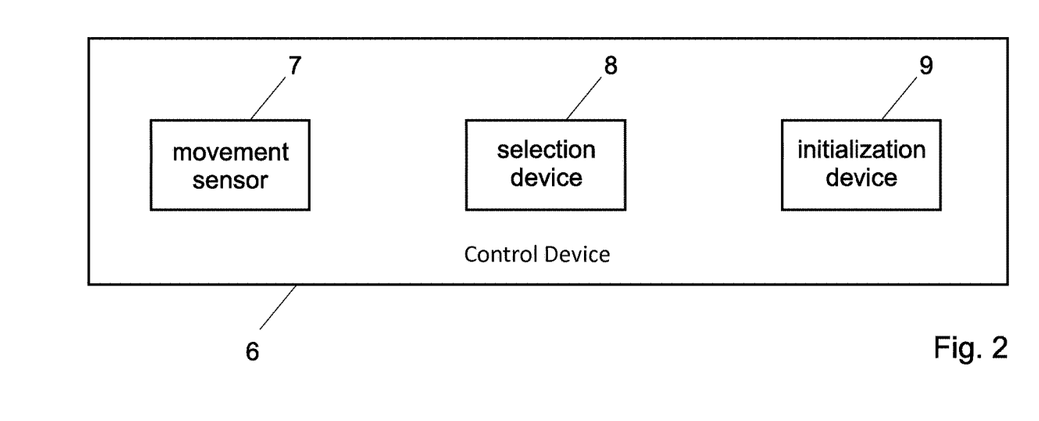
FIG. 2 illustrates an example control device of a communication system, in accordance with the present disclosure.

FIG. 2 illustrates an example control device of a communication system, in accordance with the present disclosure. Shown in FIG. 2 is an example control device 6, which may be used in a communication system, such as the communication system 100 of FIG. 1.

The control device 6, and any component thereof, may comprise suitable circuitry for implementing various aspects of the present disclosure. For example, as shown in FIG. 2, the control device 6 may comprise a movement sensor 7, a selection device 8, and an initialization device 9. The control device 6 and/or its sub-components may be placed and/or implemented centrally and/or de-centrally in communication systems. For example, the control device 6 and/or its sub-components may be placed centrally in the communication system 100, de-centrally in the fixed base stations 2, in-between in the network nodes 1, and/or distributed over a central location, the network nodes 1 and/or the fixed base stations 2.

The movement sensor 7 may be configured for detecting location and/or movement of mobile devices. In this regard, the location of mobile devices may be determined in one or more ways. For example, the location of a mobile device may be determined by triangulation of signals sent between different base stations. The location of the mobile device may also be determined (e.g., as rough estimate) based on the used fixed base station 2—e.g., the fixed base station 2 as a factor of the time of logging into or out of this fixed base station 2 respectively, and/or if the mobile device is connected with a virtual base station, as a factor of time the fixed base station 2 is transmitting as the virtual base station. The movement of mobile devices may be determined in one or more ways. For example, movement of a mobile device may be detected simply by continually determining the location over time of that mobile device.

The selection device 8 may be configured for selecting a particular fixed base station 2 into whose transmission area a group of mobile communication devices connected with a virtual base station enters or will enter. For example, the selection device 8 may be configured to select the particular fixed base station 2 on the basis of the location and/or of the movement of the group of mobile devices. In this regard, the selection device 8 may receive from the movement sensor 7, the location and/or movement of the mobile devices that are logged into a virtual base station. Alternatively, in some instances it may be sufficient to receive the location and/or movement of a representative subgroup of the mobile devices that are logged into the virtual base station. In this regard, it may be possible to determine the movement of the entire group/subgroup from the movement of the mobile devices representative of the group/subgroup—e.g., by averaging, median calculation or other functions of the individual movements.

In one example implementation, the selection may be made as soon as the group of mobile devices is located in a transition zone between a first fixed base station 2 that is transmitting the signals of the virtual base station and at least a second fixed base station 2, into whose transmission area the group of mobile devices enters. In another example implementation, the selection may be made already before reaching the transition zone and/or before the virtual base station is switched. This has the advantage that the selected fixed base station 2 may be informed already prior to the switch of the virtual base station and that a seamless transition of the virtual base station between two fixed base stations 2 may be prepared—e.g., awakening the fixed base station 2 from its idle state. In the event that, at the location of the switch or of the predicted switch of fixed base station 2 that transmits to the virtual base station, there is more than one fixed base station 2 with a good signal that can be considered, the selection may then also take into account an estimate of the future trajectory of the group of mobile devices in order to determine the next fixed base station 2 for transmitting the signals of the virtual base station. The future route can in one example implementation be estimated on the basis of the trajectory so far.

In an example implementation, the future route can be estimated on the basis of the previous trajectory in combination with data from other groups of mobile communication devices that have chosen the same or a similar previous route.

In an example implementation, the future route can be estimated on the basis of the prior trajectory in combination with data about traffic infrastructure.

In an example implementation, the future route can be estimated on the basis of a detected means of transport with a known future trajectory. The means of transport can be identified for example on the basis of the location of the group, wherein the location of the group is compared with locations of known means of transport in order to detect the means of transport. The knowledge of the future route can be taken into account for selecting the next fixed base station 2 for transmitting the signals of the virtual base station—e.g., by means of a plan of the fixed base stations, where the fixed base station 2 allows also for the future route the best connection quality and/or the longest possible connection with the fixed base station 2. For the selection, other parameters of the fixed base stations 2, such as e.g., the load, can also be taken into account. A base station may possibly be optimal for the connection due to its location, but cannot guarantee a secure connection due to the high load. Thus, an alternative fixed base station 2 may be selected, which although it has a worse location, the lower load may ultimately provide a better connection quality.

The initialization device 9 may be configured for determining the point in time that a virtual base station is generated and/or the fixed base station 2 that is used in generating a virtual base station. The communication system may decide about the creation of a virtual base station. The virtual base station is not generated upon request of a mobile device. Examples for the initialization device 9 will be described in more detail below. A virtual base station may be created when the initialization device 9 decides that a virtual base station is to be created, as described below. For this purpose, the initialization device 9 may hand over the fixed base station 2 and possibly communicate the moment in time the virtual base station is generated.

In operation, the control device 6 may be configured for generating, deleting and/or administering virtual base stations, and for giving commands to the fixed base stations 2 for transmitting signals of the virtual base stations.

The administration of a virtual base station may comprise, for example, allocating the mobile devices connected with the virtual base station and allocating the virtual base station with one or more fixed base stations 2, from which the virtual base station is transmitted. For example, the signals of the virtual base stations may be transmitted from the fixed base stations 2 connected with the mobile-services switching centers (MSC) and are included in the visitor location registers (VLR) of the mobile services switching centers (MSC). In this regard, the network node 1 may be an MSC. Thus, it may be sufficient to store an allocation of each and every virtual base station with one or more fixed base station 2 transmitting the corresponding virtual base station. In this regard, the mobile devices may independently log into a virtual base station transmitted by a fixed base station 2 if its signal is the strongest, or if other decision criteria (of the standard) result in favorable selection of the virtual base station. The control device 6 may enable monitoring currently connected mobile devices of each and every virtual base station. The administration of a virtual base station may also comprise allocating the virtual base station to a new fixed base station 2 when the selection device 8 decides to switch the fixed base station 2.

The control device 6 may delete a virtual base station, such as when certain conditions or criteria (for deletion) are fulfilled or met. In this regard, the virtual base station may be deleted only after the virtual base station has been shut down in an orderly manner. For example, shutting down may occur, for example, through a continuous weakening of the signal so that the mobile devices logged into the virtual base station automatically perform a handover to another virtual base station or to a fixed base station 2, as soon as their signal is stronger than that of the virtual base station being shut down. Example of conditions or criteria for deletion may comprise the number of the mobile devices connected with the virtual base station dropping below a specified threshold (e.g., minimum number of mobile devices). Another condition for deletion may be the control device 6 detecting that two virtual base stations have mobile devices with the same movement, and as such the control device 6 may cause one of the two virtual base stations to be shut down and deleted. Another condition for deletion may be that the virtual base station moves, since the administration of a stationary virtual base station does not make sense.

The control device 6 may be configured for sending to the fixed base stations 2 instructions to start transmitting signals of a specific virtual base station, or to stop ongoing transmission of the signals of a specific virtual base station. These instructions may be generated on the basis of, for example, allocating the fixed base station 2 to the virtual base station in the control device 6. Thus, the control device 6 may cause the virtual base station to be switched to the fixed base station 2 selected in the selection device 8.

In an example virtual base stations switching scenario, with reference to the communication system 100 of FIG. 1, transmission of signals of virtual base station may be switched from a fixed base station (e.g., the fixed base station 2.2) that is currently transmitting the signals of the virtual base station to a selected (another) fixed base station (e.g., the fixed base station 2.3). In this regard, the transmission of the signals of the virtual base station from the fixed base station 2.2 may be interrupted at the same time as the transmission of the signals of the virtual base station from the fixed base station 2.3 is started. A momentarily simultaneous transmission of the signals of the virtual base station from both fixed base stations 2.2 and 2.3 may also possible. In the case of a momentarily simultaneous transmission of the signals of the virtual base station, on the one hand the signals to be transmitted are sent to the two fixed base stations 2.2 and 2.3 by the network node 1 and, on the other hand, the data from the uplink is received in duplicate at the two fixed base stations 2.2 and 2.3.

All the mobile devices connected with the virtual base station automatically switch fixed base station 2 along their trajectory without having to request a transfer of the connection. The mobile devices being connected with the virtual base station and moving together with the virtual base station, remain connected to the same virtual base station while they communicate along their displacement with different fixed base stations 2. It may thus also be possible to predict in the network that a connection quality from one fixed base station 2 may possibly be momentarily worse than that of another fixed base station 2, yet because of the subsequent good connection quality a switching of the fixed base station 2 may not make sense. Thus, it may be possible to strategically plan for transferring the connections. Further, use of the virtual base stations in this manner may allow for continued handing over of connection but without requiring any change of existing mobile communication standards since the mobile devices need not distinguish the virtual base stations from fixed base stations 2.

In one example implementation, the initialization device 9 may query the movement sensor 7 for the location and/or the movement of mobile devices in a specific spatial area. The initialization device 9 may determine from the locations and/or movements of the mobile devices a group of mobile devices that have a similar movement pattern. For example, determining such a group of mobile devices may be achieved by detecting the same direction of movement of mobile devices that find themselves at a certain distance to one another. However, such detecting may be complex and time-consuming. Alternatively, a group of mobile devices with a common pattern of movement may be detected in that these mobile devices at sequential fixed base stations 2 log into the respective fixed base station 2 more or less simultaneously.

In an example implementation, certain fixed base stations 2 are selected randomly (e.g., by the initialization device 9) for generating a virtual base station. If a selected fixed base station 2 transmits a newly generated virtual base station and a train passes the transmission area of this fixed base station 2, some of the mobile devices log into the new virtual base station. Thus the group of mobile devices that are logged into the virtual base station moves together with the train. On the basis of the movement of the mobile devices logged into the virtual base station, a next fixed base station 2 located along the movement of the train may be selected in the selection device 8. The newly generated virtual base station thus automatically moves with a train that travels past the fixed base station 2 selected for generating the virtual base station. Step by step, the remaining mobile devices in the train may also choose this virtual base station as a preferred base station, since the latter provides continuously a good signal. Should the number of the mobile devices logged into the virtual base station not reach a minimum number of mobile devices after a specific time span, the control device 6 may delete this virtual base station again. Accordingly, it may be possible to generate virtual base stations in a self-organized fashion without great detection effort, although only those virtual base stations that have enough mobile devices may survive.

In some instances, instead of randomly selecting the fixed base station 2 and/or the moment in time for generating the virtual base station in the initialization device 9, the selection may also occur in terms of time and/or location on the basis of the timetable of the means of transport and/or on the basis of the detection of the means of transport. The means of transport may be localized through an interface (not shown) with the operator of the means of transport or directly on the basis of the signals of the means of transport. For example, a train may be detected by means of its signals in the train mobile communication network—e.g., the Global System for Mobile Communications—Railway (GSM-R). Thus, it may be possible to generate a virtual base station at locations where the means of transport will be passing.

In some implementations, the initialization device 9 may cause a virtual base station to be generated in certain situations in a targeted fashion. In this regard, it may be possible to detect that the group of mobile devices that are connected with a virtual base station has subgroups that move in different main directions—e.g., a first subgroup moving in one main direction and a second subgroup that remains stationary. This may be caused by characteristics of the transportation systems—e.g., occurring at important transfer or connection points of a railway network. Thus, the virtual base station may follow one subgroup that moves in one main direction while at location of the second subgroup (e.g., stationary location of a stationary subgroup, or at the location in the direction of which the second subgroup is moving) a new virtual base station is caused to be created.

In some example implementations, various mechanisms for generating virtual base stations may be supported and/or combined.

While selection of the next fixed base station may be decided on the basis of the movement of the mobile devices logged into the virtual base station, so that the virtual base station automatically follows the mobile devices located in a means of transport, the disclosure is not so limited. For example, it is also possible, alternatively, to determine the selection of the next fixed base station directly on the basis of the location and/or of the movement of the means of transport. In this implementation, the virtual base station is allocated directly to a specific means of transport. Such implementations are described in more detail below.

Figure 3:
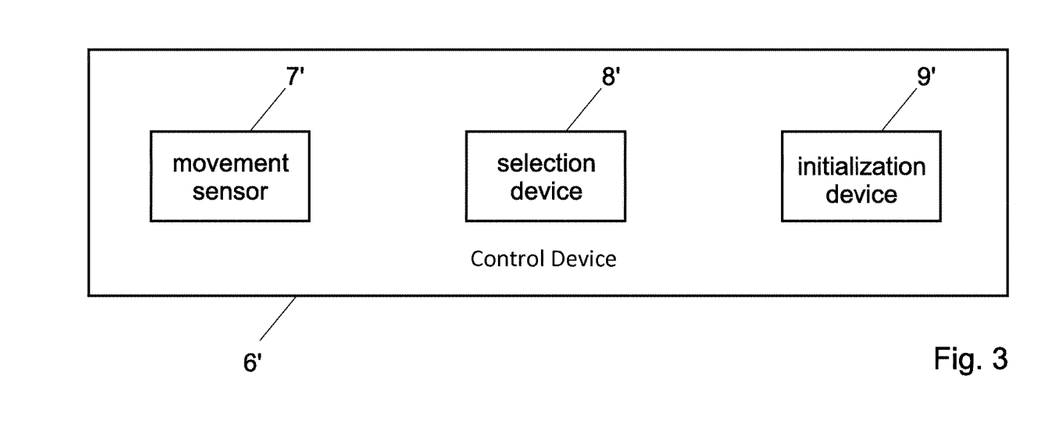
FIG. 3 illustrates an alternate example control device of a communication system, in accordance with the present disclosure.

FIG. 3 illustrates an alternate example control device of a communication system, in accordance with the present disclosure. Shown in FIG. 2 is an example control device 6', which may be used in a communication system, such as the communication system 100 of FIG. 1. In this regard, the control device 6' may represent an alternative implementation to the control device 6 of FIG. 2.

The control device 6', and any component thereof, may comprise suitable circuitry for implementing various aspects of the present disclosure. For example, as shown in FIG. 3, the control device 6' may comprise a movement sensor 7', a selection device 8', and an initialization device 9'. Inasmuch as not described otherwise, the functions of each of the control device 6', the movement sensor 7', and the selection device 8' and of the initialization device 9' may be substantially similarly to the corresponding elements in FIG. 2—that is to the control device 6, the movement sensor 7, and the selection device 8 and of the initialization device 9.

The movement sensor 7' may be configured for detecting the location and/or the movement of a means of transport (e.g., train 4, along track 3). For example, the location and/or the movement may be detected on the basis of information provided via an interface with the operator of the means of transport, or on the basis of signals of the means of transport. A train as means of transport may be detected, for example, by its signals in the train mobile communication network (e.g., GSM-R based network).

The selection device 8' may be configured for selecting, on the basis of the location and/or of the movement of a means of transport, the next fixed base station into whose transmission area the means of transport enters or will enter. In this regard, the selection device 8' may obtain from the movement sensor 7' the location and/or movement of a means of transport. For the selection, the future trajectory of the means of transport may be taken into account. The future route may be determined in the event of a possible identification of the means of transport on the basis of the timetable of the means of transport. Alternatively, the future route may be received directly from signals of the means of transport.

The initialization device 9' may be configured for controlling the generation of virtual base stations—e.g., determining the moment in time and/or the fixed base station 2 for the generation of a new virtual base station. For example, the moment in time and/or the fixed base station 2 from which the virtual base station is to be transmitted for the first time may be selected on the basis of the starting point or any other location of a means of transport. The starting point or other location may be chosen according to the timetable of a means of transport or according to information from the operator of the means of transport. In some implementations, it may also be possible to detect means of transport, at least at certain points of a transport network, via the movement sensor and select a fixed base station for transmitting the new virtual base station at the location of the means of transport.

The control device 6' may be configured such that it may function to a large extent like the control device 6. Nonetheless, the control device 6' may be configured to particularly operate, at least in part, on the basis of the means of transport (e.g., train 4) itself. Thus, the virtual base station may be deleted in the control device 6' if the means of transport has reached its destination, regardless of the log status of the mobile devices therein.

Figure 4:
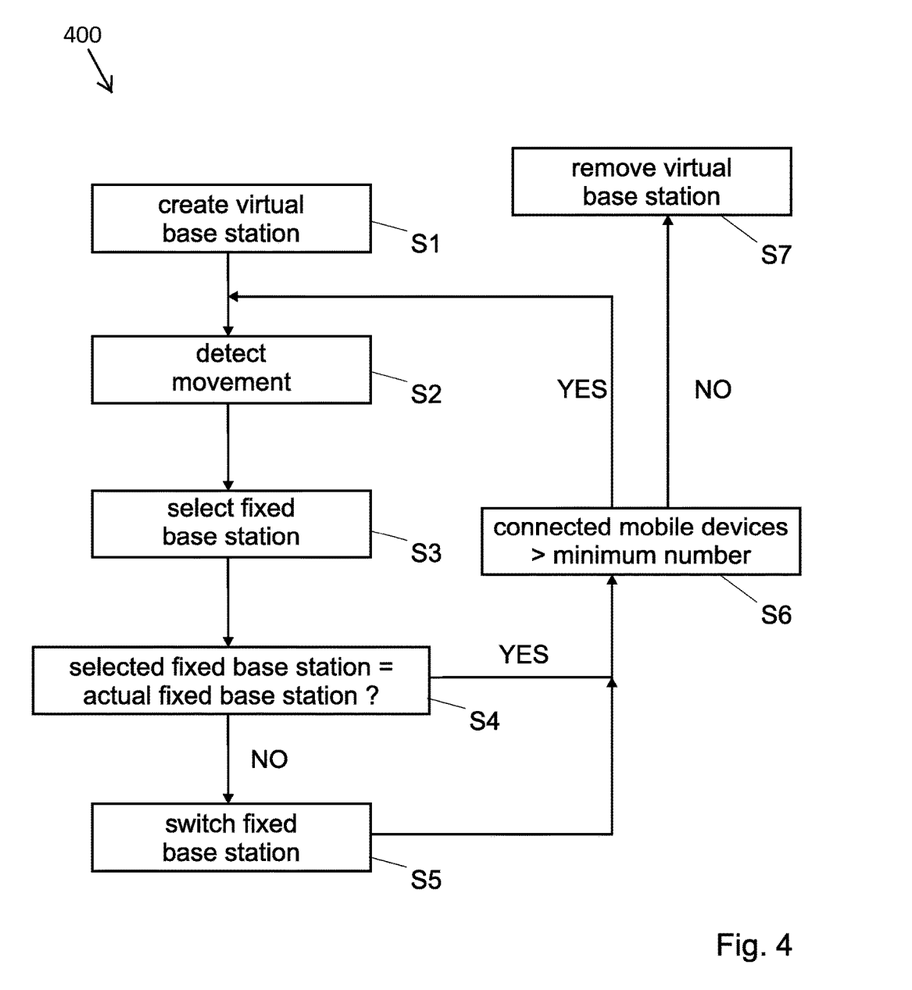
FIG. 4 is a flow chart illustrating an example process, in accordance with the present disclosure.

FIG. 4 is a flow chart illustrating an example process, in accordance with the present disclosure. Shown in FIG. 4 is a flow chart 400, comprising a plurality of example steps, which may be performed in a communication system (e.g., the communication system 100 of FIG. 1) for controlling the virtual base stations.

In step S1, a virtual base station may be generated, as described with respect to FIGS. 1-3, for example. The generation of the virtual base station may comprise, for example, such actions or operations as determining a specific fixed base station (e.g., one of the fixed base stations 2) for transmitting as the virtual base station, depending on the particular implementation being used. The specific fixed base station may be determined (or selected), for example, on the basis of a group of mobile devices moving together being detected, on the basis of a means of transport being detected, on the basis of the timetable of a means of transport and/or on a random basis. The signals of the virtual base station may be transmitted from the specific fixed base station.

In step S2, the movement and/or location of a group of mobile devices logged into the virtual base station or of a means of transport may be determined. The manner by which the determination is made may depend on the particular implementation being used, as described with respect to the previous figures for example.

In step S3, a new fixed base station (another one of the fixed base stations 2) may be selected. The new fixed base station may be selected adaptively, depending on the particular implementation being used, as described above. For example, the fixed base station may be selected on the basis of the specific movement or specific location, as described in relation with the selection device 8 or 8'.

In step S4, it may be verified whether the new fixed base station is the same as the fixed base station that is currently transmitting the signals of the virtual base station (that is the fixed base station previously determined in step S1). In instances where it is determined that the newly selected fixed base station is not the same, the process may proceed to step S5, to facilitate switching the fixed base station used in transmitting as the virtual base station. Otherwise, in instances where it is determined that newly selected fixed base station is the same fixed base station currently transmitting the virtual base station, the process may proceed directly to step S6.

In step S5, the fixed base station transmitting as the virtual base station may be switched to the newly selected fixed base station—that is the fixed base station selected in step S3. For example, to effectuate the switch to the newly selected fixed base station, the sending of the signals of the virtual base station from the currently transmitting fixed base station may be interrupted and the sending of the signals of the virtual base station of the newly selected fixed base station may be started. In this regard, such change (stop and start) in transmission may be made possible due to use of multicast connections (e.g., the connection(s) 5 in FIG. 1) with both fixed base stations. Accordingly, the change may be made possible by use of simple commands—e.g., a command to the newly selected fixed base station to emit the data packages of the virtual base station, and/or a command to the current fixed base station to stop transmission. Further, a change of the data flow in the network nodes may not be necessary as long as a switch of the fixed base stations takes place within the same multicast network, since both fixed base stations have access to the same data. The process may then continue to step S6.

In step S6, it may be verified whether any virtual base station deletion condition occurred. For example, a verification whether a specified minimum number of mobile devices remained logged into the virtual base station, such as for particular duration, may be performed. If this is not the case over a specific period of time, the virtual base station may be shut down and deleted and the transmission of its signals is stopped. Otherwise, if there is a sufficient number of mobile devices logged into the virtual base station or if the minimum period of time has not been exceeded yet, the process may continue—e.g., by looping back to step S2.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein.

Accordingly, the present disclosure may be realized in hardware, software, or a combination of hardware and software. The present disclosure may be realized in a centralized fashion in at least one computer system, or in a distributed fashion where different units are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure makes reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present disclosure not be limited to the particular embodiment disclosed, but that the present disclosure will include all embodiments falling within the scope of the appended claims.

What is claimed:
1. A method, comprising:
assigning a fixed base station in a communication system to operate as a virtual base station;
communicating data of the virtual base station from at least one network node in the communication system to the assigned fixed base station and to one or more other fixed base stations in the communication system, over one or more multicast or broadcast connections;

emitting signals of the virtual base station from the assigned fixed base station based on the communicated data of the virtual base station; and configuring at least one of the one or more other fixed base stations to assume, when a switch of assignment of the virtual base stations is required, emitting signals of the virtual base station using the communicated data of the virtual base station.

2. The method of claim 1, comprising communicating the data of the virtual base station from the at least one network node to the assigned fixed base station and to the one or more other fixed base stations such that a same data flow for the virtual base station is provided in the one or more multicast or broadcast connections.

3. The method of claim 1, comprising switching assignment of the virtual base station to a one of the one or more other fixed base stations.

4. The method of claim 3, comprising emitting signals of the virtual base station from the one of the one or more other fixed base stations based on the data of the virtual base station.

5. The method of claim 3, comprising stopping emission of signals of the virtual base station from the assigned fixed base station after switching assignment of the virtual base station.

6. The method of claim 3, comprising selecting the one of the one or more other fixed base stations based on movement of one or more mobile devices connected with the virtual base station.

7. The method of claim 3, comprising selecting the one of the one or more other fixed base stations based on movement of a transportation means associated with the virtual base station.

8. The method of claim 1, comprising:
assigning a second fixed base station to operate as a second virtual base station;
communicating data of the second virtual base station from the at least one network node, over the one or more multicast or broadcast connections, to one or more of:
the fixed base station assigned to operate as the virtual base station,
the second fixed base station assigned to operate as the second virtual base station, and
one or more other fixed base stations;
emitting signals of the second virtual base station from the second fixed base station.

9. The method of claim 8, comprising:
communicating the data of the virtual base station from the fixed base station assigned to operate as the virtual base station to the at least one network node with a multiplexing method over the one or more multicast or broadcast connections; and
communicating the data of the second virtual base station from the second fixed base station assigned to operate as the second virtual base station to the at least one network node with a multiplexing method over the one or more multicast or broadcast connections.

10. The method of claim 1, comprising addressing the data of the virtual base station communicated in the one or more multicast or broadcast connections.

11. The method of claim 1, comprising setting the one or more multicast or broadcast connections via a passive optical network (PON).

12. The method of claim 1, wherein the communication system comprises a mobile radio network, and said fixed base stations comprising base stations of the mobile radio network.

13. A system, comprising:
one or more circuits for use in a communication system, the one or more circuits being operable to:
assign a fixed base station in a communication system to operate as a virtual base station;
cause communication of data of the virtual base station from at least one network node in the communication system to the assigned fixed base station and to one or more other fixed base stations in a communication system, over one or more multicast or broadcast connections;
cause emission of signals of the virtual base station from the assigned fixed base station based on the communicated data of the virtual base station; and
configure at least one of the one or more other fixed base stations to assume, when a switch of assignment of the virtual base stations is required, emitting signals of the virtual base station using the communicated data of the virtual base station.

14. The system of claim 13, wherein the data of the virtual base station is communicated from the at least one network node to the assigned fixed base station and to the one or more other fixed base stations such that a same data flow for the virtual base station is provided in the one or more multicast or broadcast connections.

15. The system of claim 13, wherein the one or more circuits are operable to switch assignment of the virtual base station to a one of the one or more other fixed base stations.

16. The system of claim 15, wherein the one of the one or more other fixed base stations is operable to emit signals of the virtual base station based on the data of the virtual base station.

17. The system of claim 15, wherein the one or more circuits are operable to stopping emission of signals of the virtual base station from the assigned fixed base station after switching assignment of the virtual base station.

18. The system of claim 15, wherein the one or more circuits are operable to select the one of the one or more other fixed base stations based on movement of one or more mobile devices connected with the virtual base station.

19. The system of claim 15, wherein the one or more circuits are operable to select the one of the one or more other fixed base stations based on movement of a transportation means associated with the virtual base station.

20. The system of claim 13, wherein the one or more circuits are operable to:
assign a second fixed base station to operate as a second virtual base station;
cause communication of data of the virtual base station from at least one network node in the communication system to the assigned fixed base station and to one or more other fixed base stations in a communication system, over one or more multicast or broadcast connections;
cause communication of data of the second virtual base station from the at least one network node, over the one or more multicast or broadcast connections, to one or more of:
the fixed base station assigned to operate as the virtual base station,
the second fixed base station assigned to operate as the second virtual base station, and
one or more other fixed base stations;

cause emission of signals of the second virtual base station from the second fixed base station.

21. The system of claim 20, wherein the one or more circuits are operable to:
configure communication of the data of the virtual base station from the fixed base station assigned to operate as the virtual base station to the at least one network node, to use a multiplexing method over the one or more multicast or broadcast connections; and
configure communication of the data of the second virtual base station from the second fixed base station assigned to operate as the second virtual base station to the at least one network node, to use a multiplexing method over the one or more multicast or broadcast connections.

22. The system of claim 13, wherein the one or more circuits are operable to address the data of the virtual base station communicated in the one or more multicast or broadcast connections.

23. The system of claim 13, wherein the one or more multicast or broadcast connections are set in or as a passive optical network (PON).

24. The system of claim 13, wherein the communication system comprises a mobile radio network, and said fixed base stations comprising base stations of the mobile radio network.

25. A communication system, comprising:
a plurality of fixed base stations configured for wireless communication with mobile devices;
a network node configured to communicate-with the plurality fixed base stations; and
one or more circuits for use in controlling use of virtual base stations in the communication system,
wherein the use of the virtual base stations comprises:
assigning a fixed base station in the plurality of fixed base stations to operate as a virtual base station;
communicating data of the virtual base station from the network node to the assigned fixed base station and to one or more other fixed base stations in the plurality of fixed base stations, over one or more multicast or broadcast connections
emitting signals of the virtual base station from the assigned fixed base station based on the communicated data of the virtual base station; and
configuring at least one of the one or more other fixed base stations to assume, when a switch of assignment of the virtual base stations is required, emitting signals of the virtual base station using the communicated data of the virtual base station.

26. The communication system of claim 25, wherein the one or more multicast or broadcast connections comprise a first link with one of the fixed base stations, the first link branching to a second link to a second one of the fixed base stations, and the second link branching to a third one of the fixed base stations.

27. The method of claim 1, comprising receiving signals of the virtual base station at the assigned fixed base station, wherein the received signals are communicated from the assigned fixed base station to the network node.

* * * * *